United States Patent
Sane et al.

(10) Patent No.: US 9,315,268 B2
(45) Date of Patent: Apr. 19, 2016

(54) PAYLOAD TOUCHDOWN DETECTION

(71) Applicant: Sikorsky Aircraft Corporation, Stratford, CT (US)

(72) Inventors: Harshad S. Sane, Southbury, CT (US); Igor Cherepinsky, Sandy Hook, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 114 days.

(21) Appl. No.: 14/096,534

(22) Filed: Dec. 4, 2013

(65) Prior Publication Data
US 2015/0151837 A1    Jun. 4, 2015

(51) Int. Cl.
B64D 1/00    (2006.01)
B64D 1/12    (2006.01)
B64D 1/02    (2006.01)
G05D 1/08    (2006.01)

(52) U.S. Cl.
CPC .. B64D 1/12 (2013.01); B64D 1/02 (2013.01); G05D 1/0858 (2013.01)

(58) Field of Classification Search
USPC ..................................................... 701/3, 14
See application file for complete search history.

(56) References Cited

U.S. PATENT DOCUMENTS

| 3,218,100 | A |   | 11/1965 | Bendl |
| 3,957,234 | A |   | 5/1976 | Mulvey et al. |
| 4,780,838 | A | * | 10/1988 | Adelson ........................ 702/174 |
| 5,465,925 | A |   | 11/1995 | Connolly et al. |
| 5,499,785 | A |   | 3/1996 | Roberts et al. |
| 7,954,766 | B2 | * | 6/2011 | Brainard et al. .............. 244/194 |
| 8,532,846 | B2 |   | 9/2013 | Tollenaere et al. |
| 2007/0200032 | A1 | * | 8/2007 | Eadie et al. ................. 244/137.4 |
| 2010/0140412 | A1 |   | 6/2010 | Certain |
| 2013/0299640 | A1 |   | 11/2013 | Kelly et al. |

FOREIGN PATENT DOCUMENTS

WO    2008018912 A2    2/2008

OTHER PUBLICATIONS

Extended EP Search Report; Application No. 14195618.5—1802/2881830, Issued Sep. 18, 2015; 5 pages.

* cited by examiner

*Primary Examiner* — Yonel Beaulieu
(74) *Attorney, Agent, or Firm* — Cantor Colburn LLP

(57) ABSTRACT

Embodiments are directed to obtaining data associated with at least one aircraft flight parameter when an aircraft is being operated in flight; processing the data to determine that the at least one aircraft flight parameter indicates a change in value in an amount greater than a threshold; and decoupling a load from the aircraft based on determining that the at least one aircraft flight parameter indicates the change in value in the amount greater than the threshold.

19 Claims, 5 Drawing Sheets

PAYLOAD TOUCHDOWN DETECTION

BACKGROUND

An aircraft, such as a rotorcraft, may be used to transport cargo or a payload to a destination. Slung load cargo may often contain sensitive equipment or may be subject to a maximum drop rate or impact force at the time of drop off. The cargo, or equipment contained therein, might not withstand excessive impact associated with gravitational forces. In autonomous cargo applications, such as in unmanned aerial vehicle (UAV) applications, the cargo is delivered and dropped autonomously by a UAV vertical takeoff and landing (VTOL) platform. In such a case, the UAV needs to sense the event of the cargo making contact with the ground in order to perform a safe and controlled detachment operation with respect to the cargo.

Management of these transitions has traditionally been approached by additional sling load sensors, camera optical aids, and other sensors. These solutions entail higher cost and multiple points of failure. Soft-weight-on-wheels algorithms have been suggested, however, such algorithms do not apply to slung load situations.

BRIEF SUMMARY

An embodiment is directed to a method comprising: obtaining data associated with at least one aircraft flight parameter when an aircraft is being operated in flight; processing the data to determine that the at least one aircraft flight parameter indicates a change in value in an amount greater than a threshold; and decoupling a load from the aircraft based on determining that the at least one aircraft flight parameter indicates the change in value in the amount greater than the threshold.

An embodiment is directed to an apparatus comprising: at least one processor; and memory having instructions stored thereon that, when executed by the at least one processor, cause the apparatus to: obtain data associated with at least one aircraft flight parameter when an aircraft is being operated in flight; process the data to determine that the at least one aircraft flight parameter indicates a change in value in an amount greater than a threshold; and cause a load to be decoupled from the aircraft based on determining that the at least one aircraft flight parameter indicates the change in value in the amount greater than the threshold.

An embodiment is directed to an aircraft comprising: a plurality of sensors configured to provide data pertaining to collective input, engine power, and shaft torque; and a control computer configured to: process the data to determine that at a weighted combination of the collective input, engine power, and shaft torque indicates a step change in value in an amount greater than a threshold magnitude as a function of time during flight; and cause a load to be decoupled from the aircraft based at least in part on determining that the weighted combination of the collective input, engine power, and shaft torque indicates the step change in value.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
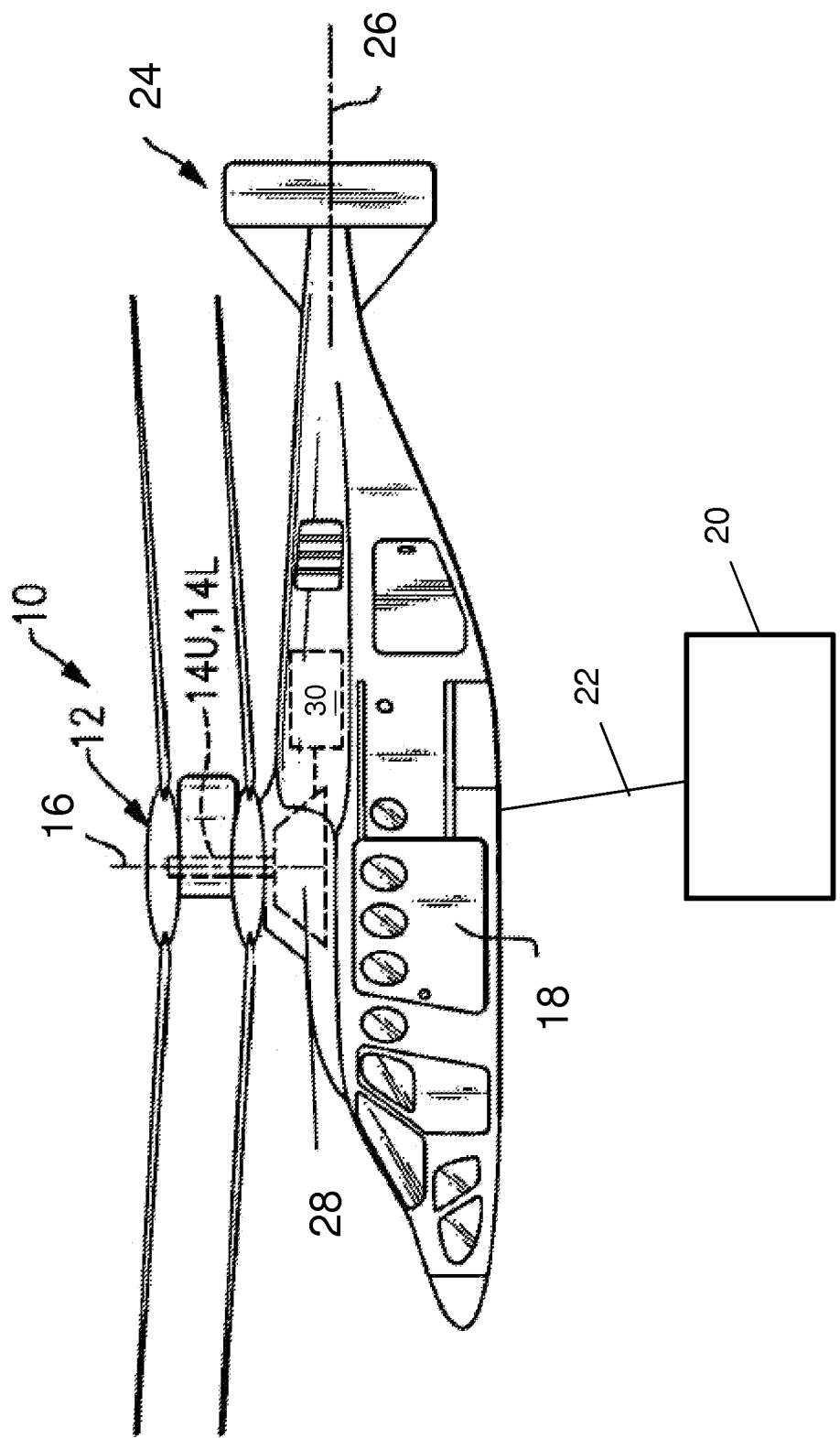
FIG. 1A is a general perspective side view of an exemplary rotary wing aircraft.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for detecting a load touchdown event. Detection of a load touchdown event may enable a safe transition to a stable load-detachment operation, wherein the load-detachment operation may be based on one or more autonomous or manual operations. Detection of a load touchdown event may occur without requiring the inclusion of additional or dedicated sensors. Existing flight control computer (FCC) parameters may be monitored to detect a touchdown event. Embodiments of the disclosure may provide for autonomous drop-off of cargo without a need for ground personnel to direct the aircraft descent till the touchdown event occurs.

FIG. 1A illustrates an exemplary vertical takeoff and landing (VTOL) rotary wing aircraft 10. The aircraft 10 is shown as having a dual, counter-rotating main rotor system 12, which rotates about a rotating main rotor shaft 14U, and a counter-rotating main rotor shaft 14L, both about an axis of rotation 16. Other types of configurations may be used in some embodiments, such as a single rotor system 12.

The aircraft 10 includes an airframe 18 which supports the main rotor system 12 as well as an optional translational thrust system 24 which provides translational thrust during high speed forward flight, generally parallel to an aircraft longitudinal axis 26.

A main gearbox 28 located above the aircraft cabin drives the rotor system 12. The translational thrust system 24 may be driven by the same main gearbox 28 which drives the rotor system 12. The main gearbox 28 is driven by one or more engines 30. As shown, the main gearbox 28 may be interposed between the engines 30, the rotor system 12, and the translational thrust system 24.

The aircraft may be configured to deliver a load or payload, such as cargo 20. The cargo 20 may be coupled to the aircraft 10 via a sling 22. When touchdown of the cargo 20 has occurred, or is imminent within a threshold distance of the ground or an object, the cargo 20 may be decoupled or detached from the sling 22.

Although a particular counter-rotating, coaxial rotor system aircraft configuration is illustrated in the embodiment of FIG. 1A, other rotor systems and other aircraft types such as tilt-wing and tilt-rotor aircrafts may benefit from the present disclosure.

Figure 1B:
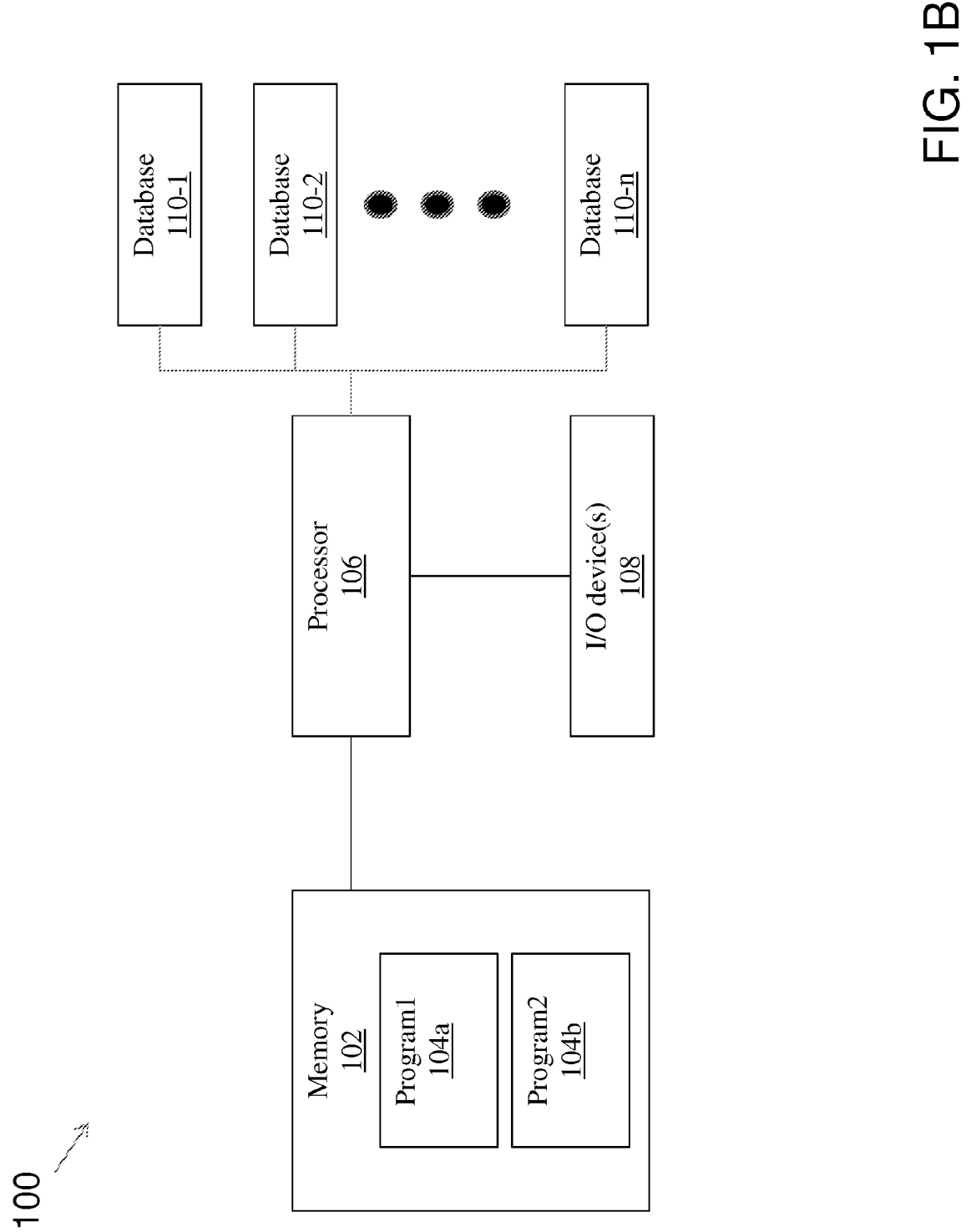
FIG. 1B is a schematic block diagram illustrating an exemplary computing system.

Referring to FIG. 1B, an exemplary computing system 100 is shown. Computing system 100 may be part of a flight control system of the aircraft 10. The system 100 is shown as including a memory 102. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1B as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a control stick, a joystick, a printer, a telephone or mobile device (e.g., a smartphone), a sensor, etc. The I/O device(s) 108 may be configured to provide an interface to allow a user to interact with the system 100.

As shown, the processor 106 may be coupled to a number 'n' of databases, 110-1, 110-2, ... 110-n. The databases 110 may be used to store data, such as data obtained from one or more sensors (e.g., accelerometers). In some embodiments, the data may pertain to an aircraft's measured altitude and sink rate.

The system 100 is illustrative. In some embodiments, one or more of the entities may be optional. In some embodiments, additional entities not shown may be included. In some embodiments, the entities may be arranged or organized in a manner different from what is shown in FIG. 1B. For example, in some embodiments, the memory 102 may be coupled to or combined with one or more of the databases 110.

Figure 2:
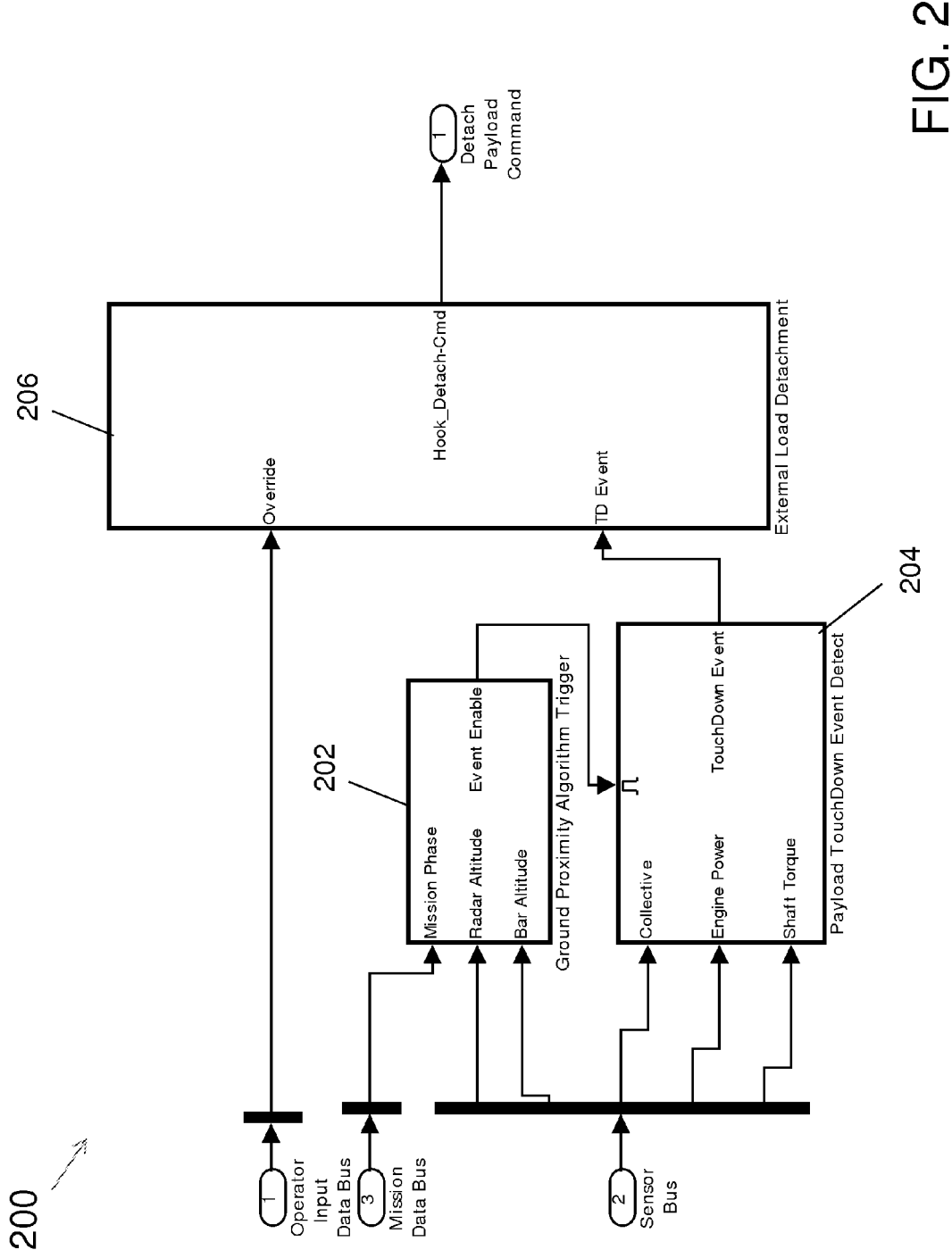
FIG. 2 is a block diagram of an exemplary system environment.

Embodiments of the disclosure may be used in connection with a mission phase when a VTOL aircraft is in a controlled descent to drop or deposit slung-load cargo on the ground. Referring to FIG. 2, a block diagram of a system 200 in accordance with one or more embodiments is shown. The system 200 may be used to detect a touchdown event and command a decoupling or detachment of a payload.

The system 200 includes a trigger device 202 and a detection device 204. The detection device 204 may monitor various parameters associated with an aircraft (e.g., a helicopter), such as collective input, engine power, and shaft torque, to detect the event or instances when the payload contacts the ground. The collective input, engine power, and shaft torque may demonstrate a step drop or change in value in the event of touchdown when an aircraft is being operated under controlled descent for vertical velocity or altitude. The step drop in value may be observed in an event another heavy payload—such as fuel tanks, heavy equipment, or several onboard personnel—departs the aircraft. In lieu of the use of the trigger device 202, these events may also be detected if the detection device 204 is enabled. In this regard, the trigger device 202 may be configured to signal or enable the detection device 204 in only particular instances or under specified conditions.

The step drop in value described above may occur because the aircraft may require less power and torque to maintain constant vertical velocity or altitude at lower gross weight. In case of additional sensors that provide load position and location information, such as load force sensors, cameras, a laser-based sensor, etc., these sensors can be included in the detection device 204 to augment the detection.

The trigger device 202 may accept input from altitude or pressure sensors that indicate a location of the aircraft above ground with respect to sling length and payload height. If one or more sensors indicate that the bottom of the payload is within a threshold of the ground, the trigger device 202 may set an output trigger to enable the operation of the detection device 204.

The trigger device 202 may include enable inputs from a mission management state machine or operator input so as to prevent a trigger in unwanted situations. For example, the trigger device 202 might not enable the detection device 204 in some instances to account for events in flight that could cause a change in one or more parameters measured by the detection device that might otherwise seem to indicate that a touchdown event has occurred. Such events could include a vibration associated with the collective, paratroopers exiting the aircraft, etc.

The detection device 204 may compute an event indicator function that is a combination of collective, engine power, and torque parameters. The function may be computed by scaling and weighing these parameters through a set of nonlinear gains and dynamic weights. Filters may be selected to reflect parameter dynamics.

Figure 3:
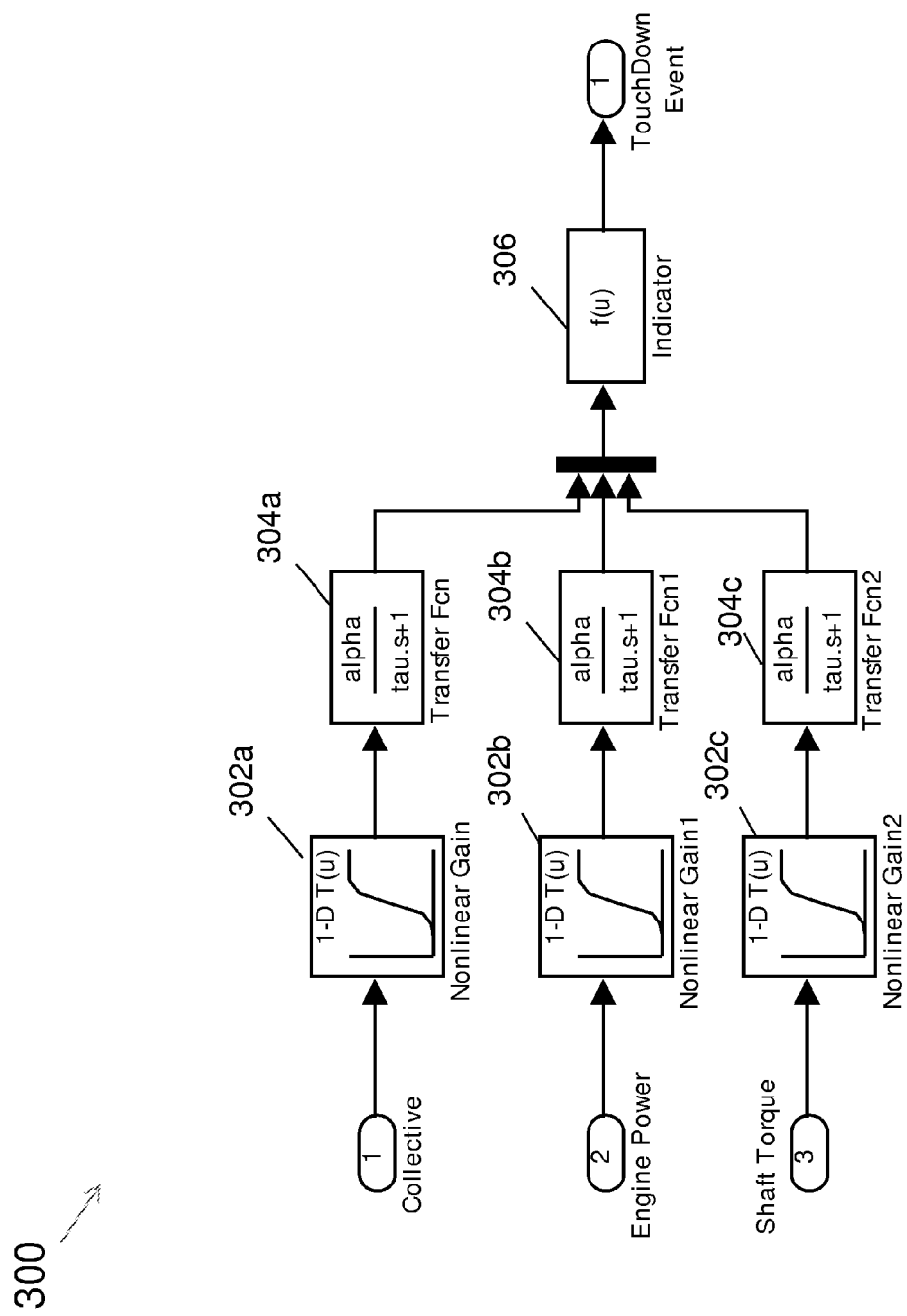
FIG. 3 is a block diagram of an exemplary system environment.

Referring to FIG. 3, a system environment 300 for detecting a touchdown event is shown. The system 300 may be implemented as part of the system 200. For example, the system 300 may be implemented in connection with the detection device 204. One or more gains (e.g., nonlinear gains) 302a, 302b, and 302c, and/or transfer functions/filters 304a, 304b, 304c, may be applied with respect to vertical performance variables or parameters, such as collective, engine power, and shaft torque, to generate an indication 306 of a touchdown event. In case of additional sensors that provide load position and location information, such as load force sensors, cameras, a laser-based sensor, etc., these sensors can be included in the detection device 204 to augment the detection.

The nonlinear gains 302a, 302b, and 302c may be selected to incorporate deadbands and nonlinearities in the underlying parameters. Scaling and filtering may be performed to non-dimensionalize and time-align a step-change event in all parameters so that the event can be detected robustly. Filters and nonlinear gains might not be needed if the parameters do not have nonlinearities and occur in similar time-scale. There are many ways of designing these filters and tuning them as would be known to one of skill in the art—the system 300 captures all such instances and embodiments.

During a slung payload touchdown event, the output of the detection device 204 or the indicator 306 may undergo a step change from an airborne-regime to a ground-contact-regime. One or more thresholds may be selected, in terms of magnitude and/or time, to distinguish between the two regimes. In the event that the aircraft lifts off with the payload attached, the detection device 204 or the indicator 306 may experience a change in value corresponding to the airborne-regime. A detachment device 206 may process the output of the detection device 204 (or the indicator 306) to trigger detachment or disengagement of the payload.

The detachment device 206 may receive one or more inputs from an operator input data bus that may serve as an override. The operator may be a pilot, a remote pilot, an onboard operator, or a remote operator. The override may be used to selectively detach or retain a payload, potentially irrespective of the output of the detection device 204. In some instances, the input driving the operator input data bus may be remotely located from the detachment device 206 or an aircraft.

In embodiments where load sensors are available in the sling system (e.g., sling 22), signals from the load sensors may serve as inputs to the detection device 204 or the indicator 306. The signals from the load sensors may be weighted in proportion to the reliability of the load sensors. Incorporating the signals from the load sensors may enhance the robustness of payload touchdown detection.

Figure 4:
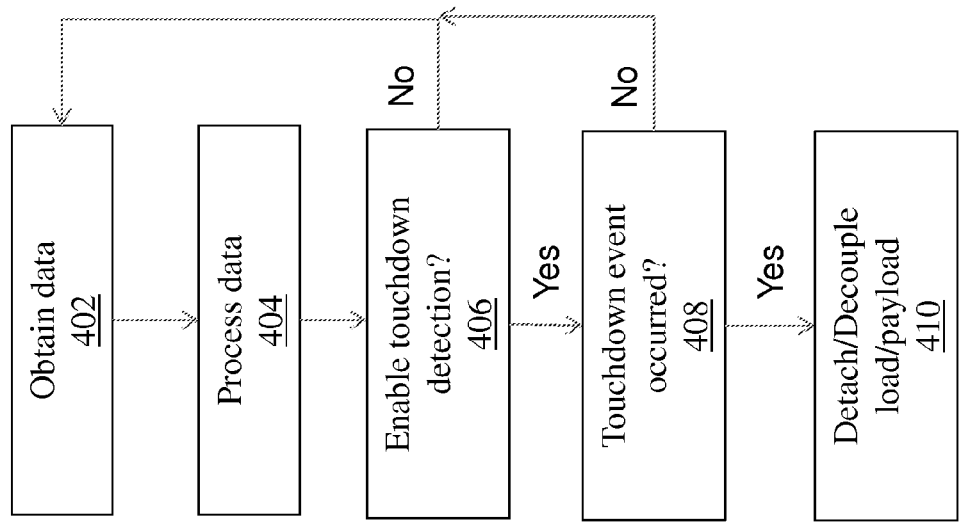
FIG. 4 illustrates a flow chart of an exemplary method.

Turning now to FIG. 4, a flow chart of an exemplary method 400 is shown. The method 400 may be executed by one or more systems, components, or devices, such as those described herein (e.g., the system 100, the system 200, and/or the system 300). The method 400 may be used to robustly and accurately detect a touchdown event in connection with a payload of an aircraft.

In block 402, data associated with the operation of the aircraft may be obtained. For example, the data may pertain to operator input data, mission data, and/or data from one or more sensors.

In block 404, the data of block 402 may be processed. As part of block 404, the data may be filtered to remove extraneous data, to reduce the impact of noise on one or more measurements, or to obtain a data profile that more closely mirrors or resembles the physical world.

In block 406, a determination may be made whether, based on the processed data of block 404, a touchdown detection event should be enabled. A touchdown detection event might be enabled when a mission phase associated with the aircraft indicates as such and the aircraft is within a threshold distance of the ground or an object. If a touchdown detection event should be enabled (e.g., the "yes" path is taken out of block 406), flow may proceed from block 406 to block 408. Otherwise (e.g., the "no" path is taken out of block 406), flow may proceed from block 406 to block 402.

In block 408, a determination may be made whether, based on the processed data of block 404, a touchdown event has occurred. If so (e.g., the "yes" path is taken out of block 408, flow may proceed from block 408 to block 410). Otherwise (e.g., the "no" path is taken out of block 408), flow may proceed from block 408 to block 402.

In block 410, a load or payload may be detached or decoupled from the aircraft.

The method 400 is illustrative. In some embodiments, one or more of the blocks or operations (or a portion thereof) may be optional. In some embodiments, the blocks or operations may execute in an order or sequence different from what is shown in FIG. 4. In some embodiments, one or more blocks or operations not shown may be included. For example, and as described above, an operator input may serve as an override to selectively detach or retain a load or payload.

Aspects of the disclosure may be applied in connection with a controlled vertical flight (phase). In some embodiments, controlled vertical flight may include descent at a fixed velocity or a stable altitude hold. Stable altitude hold may correspond to a controlled mode where a control algorithm or device may change a value to hold or maintain a particular value in the event of, e.g., payload detachment or alleviation. Controlled vertical flight may be used in connection with one or more of the examples described herein for selectively detaching or decoupling a payload.

In some embodiments, an estimate of gross weight changes associated with an aircraft may be provided. Such changes may be brought about by, e.g., load or fuel tank jettison events. Embodiments of the disclosure may be applied in connection with any "cause-effect" system that demonstrates a change in "effect" to detect a change in "cause" under constant velocity or position control. For example, aspects of the disclosure may be applied in connection with elevator or escalator load and motor torque.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
   obtaining data associated with at least one aircraft flight parameter when an aircraft is being operated in flight;
   processing the data to determine that the at least one aircraft flight parameter indicates a change in value in an amount greater than a threshold; and
   decoupling a load from the aircraft based on determining that the at least one aircraft flight parameter indicates the change in value in the amount greater than the threshold.

2. The method of claim 1, wherein the at least one aircraft flight parameter comprises at least one of: collective input, engine power, and shaft torque.

3. The method of claim 1, wherein the at least one aircraft flight parameter comprises a plurality of aircraft flight parameters, and wherein the processing of the data comprises scaling and weighing the aircraft flight parameters through a set of gains and dynamic weights.

4. The method of claim 3, wherein the gains comprise nonlinear gains.

5. The method of claim 1, further comprising:
   determining that the aircraft is within a threshold distance of the ground,
   wherein the decoupling of the load is enabled based at least in part on the determination that the aircraft is within the threshold distance of the ground.

6. The method of claim 5, wherein the determination that the aircraft is within the threshold distance of the ground is based on output from at least one of: an altitude sensor and a pressure sensor.

7. The method of claim 1, wherein the load comprises slung cargo.

8. An apparatus comprising:
   at least one processor; and
   memory having instructions stored thereon that, when executed by the at least one processor, cause the apparatus to:
   obtain data associated with at least one aircraft flight parameter when an aircraft is being operated in flight;

process the data to determine that the at least one aircraft flight parameter indicates a change in value in an amount greater than a threshold; and cause a load to be decoupled from the aircraft based on determining that the at least one aircraft flight parameter indicates the change in value in the amount greater than the threshold.

9. The apparatus of claim 8, wherein the at least one aircraft flight parameter comprises at least two of: collective input, engine power, and shaft torque.

10. The apparatus of claim 8, wherein the at least one aircraft flight parameter comprises a plurality of aircraft flight parameters, and wherein the instructions, when executed by the at least one processor, cause the apparatus to:

process the data by scaling and weighing the aircraft flight parameters through a set of gains and dynamic weights.

11. The apparatus of claim 10, wherein the gains comprise nonlinear gains.

12. The apparatus of claim 8, wherein the instructions, when executed by the at least one processor, cause the apparatus to:

determine that the aircraft is within a threshold distance of the ground, wherein the decoupling of the load is enabled based at least in part on the determination that the aircraft is within the threshold distance of the ground.

13. The apparatus of claim 12, wherein the determination that the aircraft is within the threshold distance of the ground is based on output from at least one of: an altitude sensor and a pressure sensor.

14. The apparatus of claim 8, wherein the load comprises a slung payload.

15. An aircraft comprising:

a plurality of sensors configured to provide data pertaining to collective input, engine power, and shaft torque; and a control computer configured to:

process the data to determine that at a weighted combination of the collective input, engine power, and shaft torque indicates a step change in value in an amount greater than a threshold magnitude as a function of time during flight; and cause a load to be decoupled from the aircraft based at least in part on determining that the weighted combination of the collective input, engine power, and shaft torque indicates the step change in value.

16. The aircraft of claim 15, further comprising:

a second plurality of sensors configured to provide second data pertaining to the load, wherein the control computer is configured to:

process the second data; and cause the load to be decoupled from the aircraft based on the processed second data.

17. The aircraft of claim 16, wherein the control computer is configured to weight the second data relative to the data in causing the load to be decoupled from the aircraft.

18. The aircraft of claim 15, wherein the control computer is configured to:

receive an operator input that serves as an override configured to selectively detach or retain the load; and cause the load to be decoupled from the aircraft based on determining that the operator input indicates that the load does not need to be retained.

19. The aircraft of claim 15, wherein the control computer is configured to process the data based on a determination that the aircraft is being operated in a controlled vertical flight comprising at least one of descent at a fixed velocity and a stable altitude hold.

* * * * *